US010516609B1

(12) United States Patent
Kwan et al.

(10) Patent No.: US 10,516,609 B1
(45) **Date of Patent: *Dec. 24, 2019**

(54) STATEFUL PACKET INSPECTION AND CLASSIFICATION

(71) Applicant: Palo Alto Networks, Inc., Santa Clara, CA (US)

(72) Inventors: Philip Kwan, San Jose, CA (US); Shu Lin, San Jose, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/823,408

(22) Filed: Nov. 27, 2017

Related U.S. Application Data

(63) Continuation of application No. 14/133,479, filed on Dec. 18, 2013, now Pat. No. 9,860,166.

(51) Int. Cl.
*H04L 12/741* (2013.01)

(52) U.S. Cl.
CPC .................................... *H04L 45/74* (2013.01)

(58) Field of Classification Search
None
See application file for complete search history.

(56) References Cited

U.S. PATENT DOCUMENTS 7,020,143 B2 3/2006 Zdan
7,050,396 B1 * 5/2006 Cohen ................ H04L 12/2854 370/235
2003/0216143 A1 11/2003 Roese
2007/0081455 A1 4/2007 Kashima
2007/0280105 A1 12/2007 Barkay
2008/0037572 A1 2/2008 Sebire
2008/0089324 A1 4/2008 Polk
2009/0016279 A1 1/2009 Beser
2012/0230200 A1 9/2012 Wentink
2013/0121262 A1 5/2013 Sadiq
2014/0016464 A1 1/2014 Shirazipour
2014/0146740 A1 5/2014 Yamashina

OTHER PUBLICATIONS

El-Gendy et al., "Evolution of the Internet QoS and Support for Soft Real-Time Applications", from Proceedings fo the IEEE, vol. 91, No. 7, Jul. 2003.

* cited by examiner

*Primary Examiner* — Alex Skripnikov
(74) *Attorney, Agent, or Firm* — Van Pelt, Yi & James LLP

(57) ABSTRACT

Stateful inspection and classification of packets is disclosed. For a first packet associated with a network traffic flow, a differentiated services header value (DSHV) is determined to associate with the first packet. The DSHV is used to perform a lookup of a quality of service treatment associated with the DSHV. The treatment is applied to the first packet. A determination is made, for a second packet associated with the network traffic flow, to associate a second DSHV with the second, where the second DSHV is different from the first DSHV.

30 Claims, 8 Drawing Sheets

STATEFUL PACKET INSPECTION AND CLASSIFICATION

CROSS-REFERENCE TO OTHER APPLICATIONS

This application is a continuation of co-pending U.S. patent application Ser. No. 14/133,479 entitled STATEFUL PACKET INSPECTION AND CLASSIFICATION filed Dec. 18, 2013 which is incorporated herein by reference for all purposes.

BACKGROUND OF THE INVENTION

The existence of latency in a network can have varying impacts on different types of network applications and associated user experiences. One example of a latency sensitive application is a Voice Over Internet Protocol (VOIP) application. Even small amounts of latency in a VOIP application can be detrimental to users' abilities to communicate with one another in a natural manner. In contrast, the presence of latency during a download of a large file may be imperceptible (or at least tolerable) to a user. There exists an ongoing need to improve network traffic classification and handling.

BRIEF DESCRIPTION OF THE DRAWINGS

Various embodiments of the invention are disclosed in the following detailed description and the accompanying drawings.

DETAILED DESCRIPTION

Figure 1:
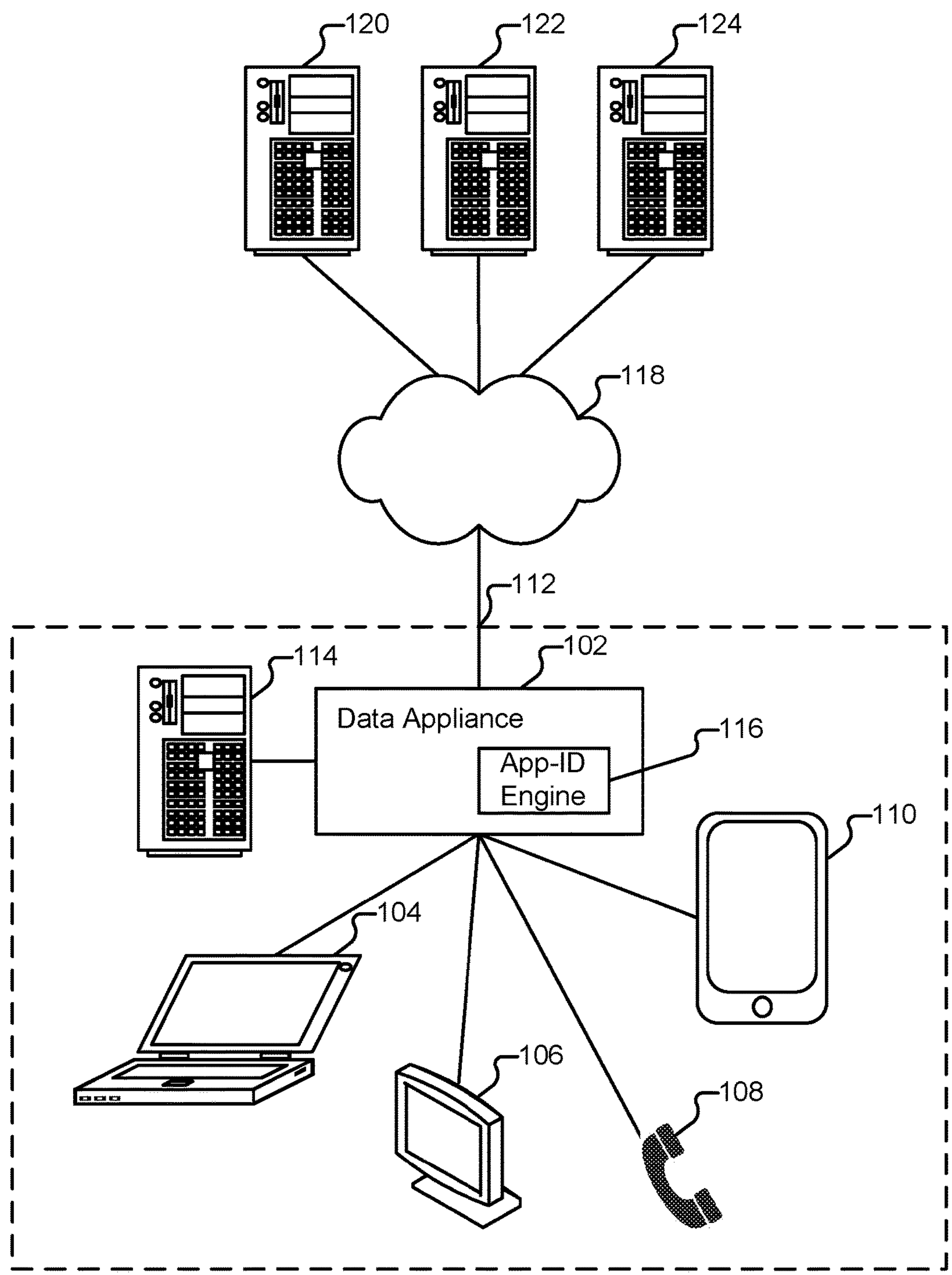
FIG. 1 illustrates an embodiment of an enterprise network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques that entities can use to help prioritize the network traffic of certain applications over other applications. As one example, traffic of latency sensitive applications (e.g., realtime voice communications) can be prioritized over other, less latency sensitive applications (e.g., file downloads). As another example, traffic associated with critical employees or roles (e.g., the Chief Operating Officer, or a member of the security team) can be prioritized over traffic associated with other employees/roles (e.g., the mail clerk), whether all such traffic, or on an application-specific (or other) basis. Thus while a company may have as a default policy that traffic associated with an entertainment-oriented streaming video service should be given the lowest priority (to conserve bandwidth resources), a second policy may exempt company executives' use of the service from the reduced quality of service. As yet another example, traffic associated with the same application can be treated differently based on a context (e.g., business use of a social media streaming application vs. personal use of the same application).

FIG. 1 illustrates an embodiment of an enterprise network. In the example shown in FIG. 1, example client devices 104-110 include a laptop computer, a desktop computer, a Voice over Internet Protocol (VOIP) phone, and a tablet (respectively) present in an enterprise network 112 (belonging to the "Acme Company").

Data appliance 102 is configured to enforce policies regarding communications between nodes inside network 112 (e.g., any of clients 104-110 and server 114) and nodes outside network 112 (e.g., any of servers 120-124) reachable via external network 118. Examples of the aforementioned policies include ones governing traffic shaping, Quality of Service (QoS), and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 112.

Appliance 102 can take a variety of forms. For example, appliance 102 can be a dedicated device or set of devices. The functionality provided by appliance 102 can also be integrated into or executed as software on a general purpose computer, a computer server, a gateway, a virtual machine, and/or a network/routing device. In some embodiments, services provided by data appliance 102 are instead (or in addition) provided to a client such as client 104 by software executing on client 104. In some embodiments, appliance 102 includes an application identification engine 116 which is configured to identify an application using various application signatures for identifying applications based on packet flow analysis. For example, application identification engine 116 can determine what type of traffic a session involves, such as Web Browsing—Social Networking; Web Browsing—News; SSH; and so on.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable. Further, although illustrated as a single element in FIG. 1, enterprise network 112 can comprise multiple networks, any/each of which can include one or multiple data appliances or other components that embody techniques described herein. For example, the techniques described herein can be deployed by large, multi-national companies (or other entities) with multiple offices in multiple geographical locations. And, while clients 104-110 are illustrated in FIG. 1 as connecting directly to data appliance 102, it is to be understood that one or more intermediate nodes (e.g., routers, switches, and/or proxies) can be and typically are interposed between various elements in network 112.

Figure 2:
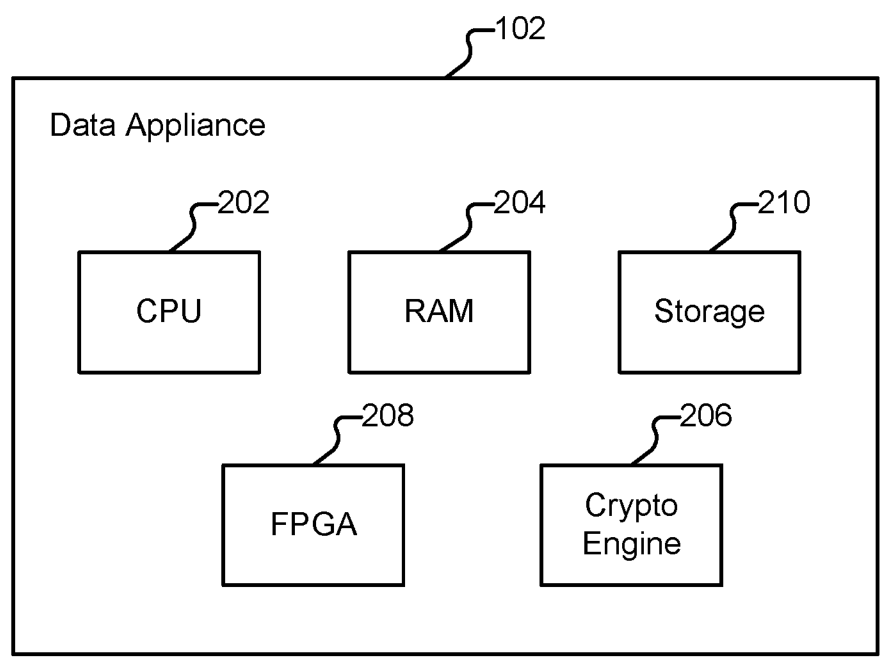
FIG. 2 illustrates an embodiment of a data appliance.

FIG. 2 illustrates an embodiment of a data appliance. The example shown is a representation of physical components that are included in appliance 102 in some embodiments. Specifically, appliance 102 includes a high performance multi-core CPU 202 and RAM 204. Appliance 102 also includes a storage 210 (such as one or more hard disks), which is used to store policy information (e.g., in policy database 402 of FIG. 4) and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Figure 3:
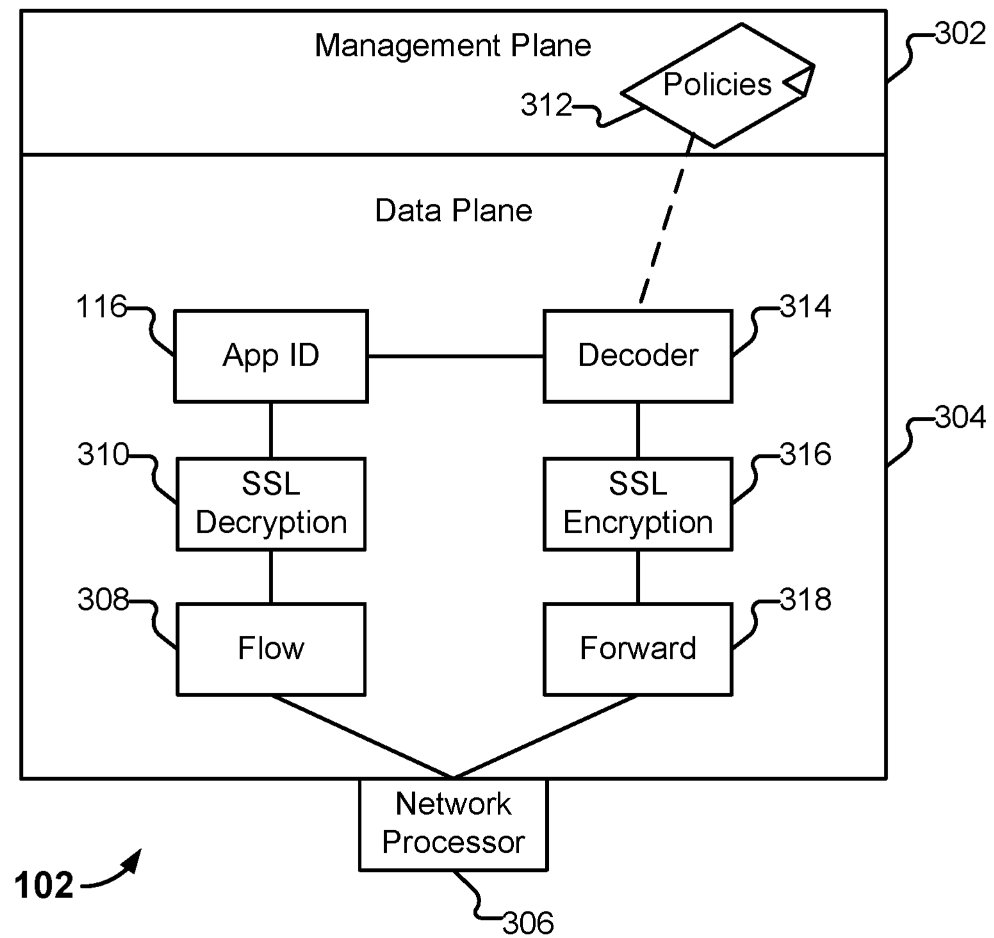
FIG. 3 illustrates an embodiment of a data appliance.

FIG. 3 illustrates an embodiment of a data appliance. The example shown is a representation of logical components that can be included in data appliance 102 in some embodiments. Specifically, data appliance 102 includes a management plane 302 and a data plane 304. The management plane is responsible for managing user interactions, such as by providing a user interface for configuring policies and viewing log data. The data plane is responsible for managing data, such as by performing packet processing and session handling. Network processor 306 is configured to receive packets from client devices, such as client device 110, and provide them to data plane 304 for processing. When flow module 308 identifies the packets as being part of a new session, it creates a new session flow. Subsequent packets will be identified as belonging to the session based on a flow lookup. If applicable, SSL decryption is applied by SSL decrypter 310. Otherwise, processing by SSL decrypter 310 is omitted. Application identification module 116 is configured to determine what type of traffic the session involves. As one example, application identification module 116 can recognize a GET request in received data and conclude that the session requires an HTTP decoder. In some cases, e.g., a web browsing session, the identified application can change, and such changes will be noted by appliance 102. For example a user may initially browse to a corporate Wiki (classified based on the URL visited as "Web Browsing—Productivity") and then subsequently browse to a social networking site (classified based on the URL visited as "Web Browsing—Social Networking"). For each type of protocol, there exists a corresponding decoder 314. Based on the determination made by application identification module 116, the packets are sent to an appropriate decoder 314. Decoder 314 is configured to assemble packets (which may be received out of order) into the correct order, perform tokenization, and extract out information. Decoder 314 also performs signature matching to determine what should happen to the packet. Decoder 314 can enforce rules (312) provided by management plane 302. As needed, packets are re-encrypted by SSL encryption module 316 and then provided to forward module 318 for transmission to an external server, such as server 124.

Differentiated Services

One approach to classifying/managing traffic (e.g., to prioritize latency sensitive traffic over other traffic) is to use "differentiated services" (also referred to as "DiffServ") in which traffic is tagged using a Differentiated Service Code Point ("DSCP"). As one example, in some embodiments, VOIP phone 108 is configured to mark the DiffServ field of the Internet Protocol ("IP") header of each of its packets using a DSCP value (also referred to as a "code point") of "EF." The particular DSCP value for VOIP phone 108 may be configured at the factory (i.e., a default value set by the manufacturer of the phone) and/or may be configured by an administrator, such as an administrator of network 112.

Some devices do not mark their own packets with DSCP information, but nonetheless have such information added by an upstream device. For example, a switch to which a device is physically connected may tag traffic originating on the device using a DSCP value specified by an administrator. In this scenario, every packet originating from the device will be tagged with the same DSCP value (i.e., because the switch is configured with tagging instructions on a per-port basis). As another example, a proxy can be configured to tag traffic originating from clients 104 and 106 based on a combination of factors, such as a user (and/or group) identification and application being used. In this scenario, different users of a workstation or other shared device may have their respective packets tagged differently based on their respective identities and/or based on the applications they use. Examples follow.

Application-Based Tagging Example

Suppose laptop 104 is assigned to an employee Alice who is a member of the Engineering group. A variety of applications are installed on Alice's laptop, including ones used for mission critical purposes (e.g., monitoring and communicating with an important resource) and ones used for Alice's amusement (e.g., a streaming video player). In various embodiments, a proxy is configured to tag packets associated with the mission critical application using a first DSCP value and to tag packets associated with the non-critical application using a second DSCP value. The proxy can be located on Alice's laptop device (or Alice's laptop can otherwise be configured to perform the application-based tagging, e.g., via agent software). The proxy can also be separate from Alice's laptop (e.g., an upstream proxy or data appliance configured to perform applicable services). In various embodiments, the proxy works in conjunction with policy database 402 and application identification engine 116 to determine which DSCP value to apply to which of Alice's traffic. As one example, the application identification obtained by application identification engine 116 can be used to query policy database 402 to obtain an applicable DSCP value. The proxy uses the determined DSCP value to tag Alice's traffic accordingly. Which DSCP value is applied to an application's traffic can be updated, as needed. For example, if Alice is initially interacting with a corporate Wiki in her web browser, a first DSCP value might be used to tag her traffic by the proxy (based on her application being identified as "Web Browsing—Productivity"). If her browsing changes (e.g., to a social networking website), a new DSCP value (e.g., reflecting a lower priority) might be used by the proxy (based on her application now being identified as "Web Browsing—Social Networking").

Context-Based Tagging Example

Traffic associated with a particular application can be tagged with different DSCP values based on one or more of a variety of factors such as who is using the application, and the nature of the use (e.g., business vs. recreational use of the application; time of day; geolocation of the device on which the application is running; geolocation of the remote server being communicated with; etc.). Suppose client 106 is a video conferencing system located in a conference room in Acme headquarters. Any Acme employee can operate the video conferencing system after supplying appropriate credentials (e.g., an employee login and password). The video conferencing system is used by Acme board members to conduct critical business meetings a few times per quarter. The system is also used by the Sales Department to hold weekly status meetings with field representatives. Finally, when the video conferencing system is not otherwise needed, employees are permitted to use the system to communicate with family members living abroad. Based on the nature of the use (i.e., with the board meeting being most critical, the sales meetings being less important, and the personal use least important), packets of the video conferencing system can be tagged differently. In some embodiments, the nature of the use is manually specified (e.g., by the user of the application at the time the application is started). The nature of the use can also be at least partially inferred (e.g., based on time of day or other schedule information, based on an identity of the user (e.g., a board member vs. the mail clerk), or other contextual information). As with previous examples, the tagging can be performed on a device (i.e., on the video conferencing system itself) and can also be performed by an upstream device/proxy.

As will be described in more detail below, data appliance 102 is configured to inspect packets for DSCP tag information and apply policies to packets based at least in part on the observed DSCP tag information. Further, as will also be described in more detail below, data appliance 102 is configured to tag return traffic with DSCP information.

Example Packet Treatment

Figure 4:
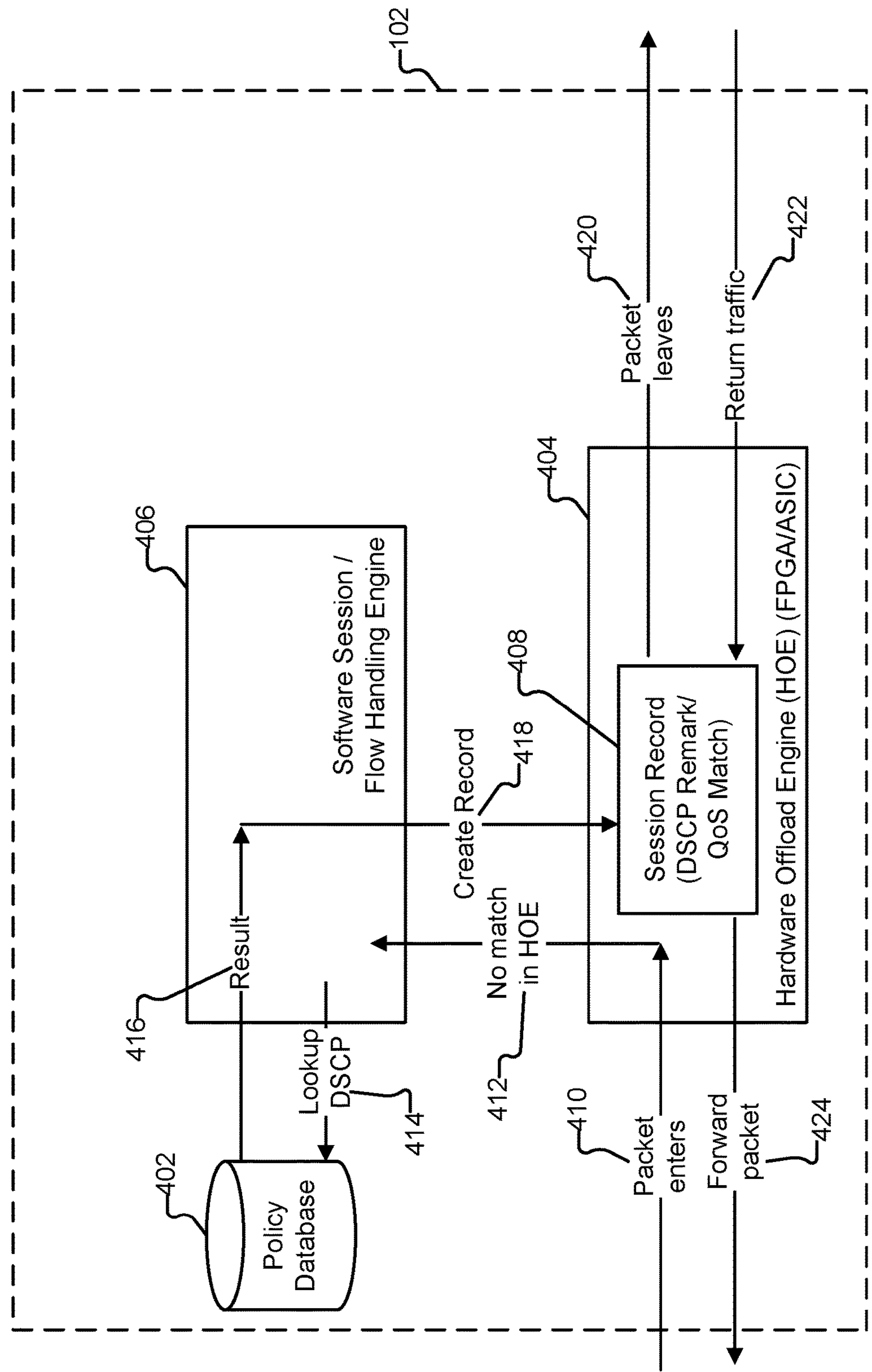
FIG. 4 illustrates an example of how a packet and associated return traffic are processed by components of a data appliance in accordance with some embodiments.

FIG. 4 illustrates an example of how a packet and associated return traffic are processed by components of data appliance 102 in accordance with some embodiments. In the example shown, a packet having a DSCP tag is received by appliance 102 at 410. As one example, suppose an Acme employee places a call using VOIP phone 108. As mentioned above, all packets originating on phone 108 are tagged by the phone with a DSCP value of "EF." Accordingly, a packet received from phone 108 at 410 includes a DSCP value of "EF." Appliance 102 determines that the received packet is not associated with an existing session/flow record in hardware offload engine 404 at 412 and provides the packet to engine 406 for processing in software. At 414, engine 406 queries policy database 402 using the DSCP value included in the packet header (e.g., using "EF"). Included in policy database 402 are mappings between DSCP code points and QoS classes, as well as instructions for how associated return traffic should be marked (also referred to herein as "remark" instructions). As one example, suppose appliance 102 includes eight QoS queues. One example mapping that can be included in policy database 402 is a mapping between packets having a DSCP value of "EF" and the first queue. The result of the query (e.g., a QoS rule match and remark instructions) is returned to engine 406 at 416. At 418, a session/flow record (308) is created in hardware offload engine 404 and includes the QoS match action and remark instructions. At this point (420), the packet is sent out by appliance 102 (e.g., to external VOIP server 122 via network 118), with the appropriate QoS treatment.

Servers 120, 122, and 124 are external servers outside the control of the administrator of appliance 102. It is highly unlikely that return traffic (e.g., originating at one of those servers as applicable) will have the same DSCP value set as appears in the packet transmitted to such servers at 420 (if any DSCP marking). Instead, the DSCP field will likely either be blank, or will have a different priority. For example, appliance 102 may be configured to tag traffic associated with streaming video server 120 with a low priority tag. The operator of server 120 may instead choose to tag traffic with a higher priority (e.g., to give viewers a better experience).

In some embodiments, appliance 102 is configured to write DSCP information to return traffic headers based on the previously described "remark" instructions. As shown in FIG. 4: At 422, a packet of return traffic associated with the VOIP call (same flow/session) is received by appliance 102. At this point in the flow, session record 408 exists in hardware offload engine 404 with respect to the VOIP call. The return traffic packet is accordingly processed in hardware offload engine 404 (rather than in software engine 406). In particular, the DiffServ field of the header of the return traffic packet has the applicable DSCP value written to it by appliance 102 and the applicable QoS treatment can be used. Finally, the return traffic packet is forwarded out of appliance 102 at 424. Subsequent packets/return packets of the session (whether originating with phone 108 or server 122) will be handled by hardware offload engine 404, i.e., packets will processed by the hardware offload engine with the applicable QoS and DSCP remark treatment, and forwarded as applicable.

Figure 5:
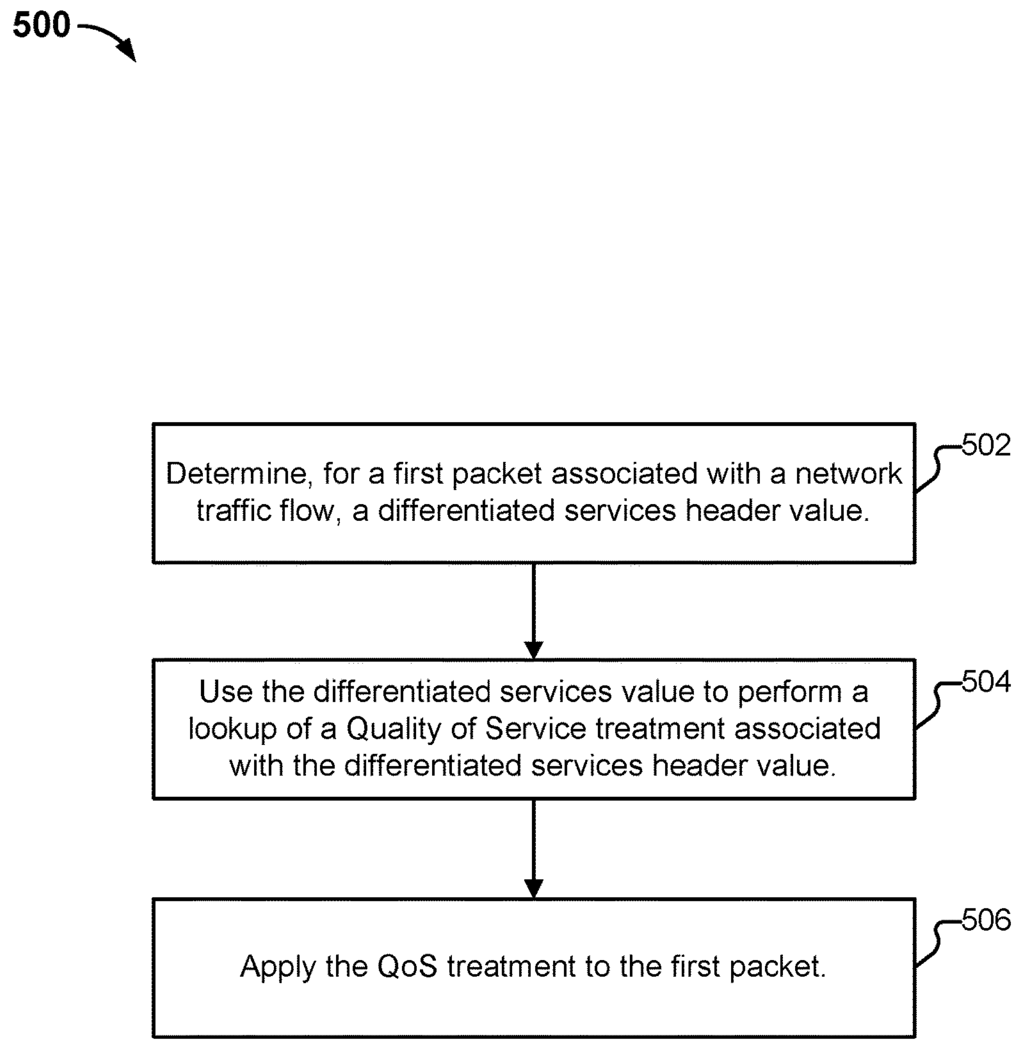
FIG. 5 illustrates an example of a process for determining a quality of service treatment to apply to a packet.

FIG. 5 illustrates an example of a process for determining a quality of service treatment to apply to a packet. In some embodiments, process 500 is performed by appliance 102. The process begins at 502 when a determination is made, for a first packet associated with a network traffic flow, of a differentiated services header value. Referring to FIG. 4, an example of portion 502 of process 500 occurs when the DSCP value of the packet received at 410 is obtained (e.g., by reading the packet header). At 504, the differentiated services header value is used to perform a lookup. An example of this portion of process 500 is seen at 414 in FIG. 4, when the DSCP value is used to query policy database 402 and a result (including an associated QoS treatment) is received. Finally, at 506, the QoS treatment is applied to the packet.

Figure 6:
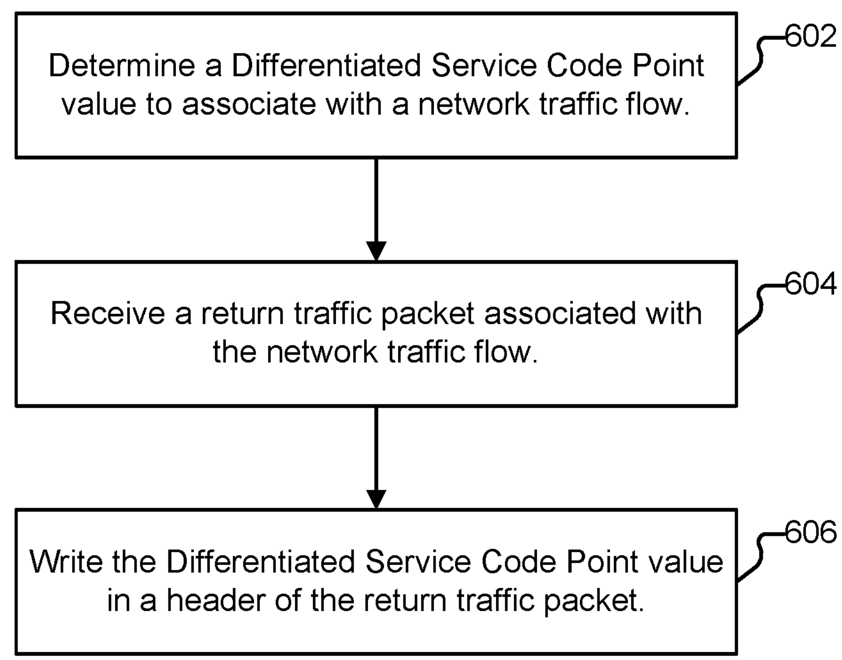
FIG. 6 illustrates an example of a process for tagging a return traffic packet with a Differentiated Service Code Point value.

FIG. 6 illustrates an example of a process for tagging a return traffic packet with a Differentiated Service Code Point value. In some embodiments, process 600 is performed by appliance 102. The process begins at 602 when a Differentiated Service Code Point value to be associated with a network traffic flow is determined. Referring to FIG. 4, an example of portion 602 of process 600 occurs when the DSCP value of the packet received at 410 is obtained (e.g., by reading the packet header). In some embodiments, the DSCP value of the outgoing traffic is automatically used as the DSCP value for return traffic (i.e., the packets have symmetric DSCP values). In other embodiments, a different DSCP value is used to tag return traffic (e.g., where policy database 402 includes a rule requiring different remarking). At 604, a return traffic packet associated with the network traffic flow is received. An example of this portion of process 600 is seen at 422 in FIG. 4. Finally, at 606, a DSCP value is written in a header of the return traffic packet. As one example of this portion of process 600, session record 408 is consulted to obtain the "DSCP remark" information (whether calling for the same or different DSCP value to be applied to the return traffic). That information is then inserted into the header of the return traffic by appliance 102. In the event a change in context associated with the flow is observed by appliance 102 (e.g., the application identification changes), a determination is made as to whether a different DSCP value should be used for tagging.

Process 600 can also be adapted to cause appliance 102 to modify DSCP values assigned to packets received from clients. As one example, as previously mentioned, VOIP phone 108 is configured to always tag all traffic using the DSCP value "EF." Accordingly, when appliance 102 receives packets from phone 108, those packets will include the DSCP value "EF" in each of their headers. Appliance 102 can be configured to change that value. In such a scenario, in addition to (or instead of) writing DSCP values to the return traffic headers, appliance 102 also overwrites the "EF" value with an applicable value (e.g., determined based on a policy stored in database 402 and obtained in response to query 414).

Example Configuration Interfaces

Figure 7:
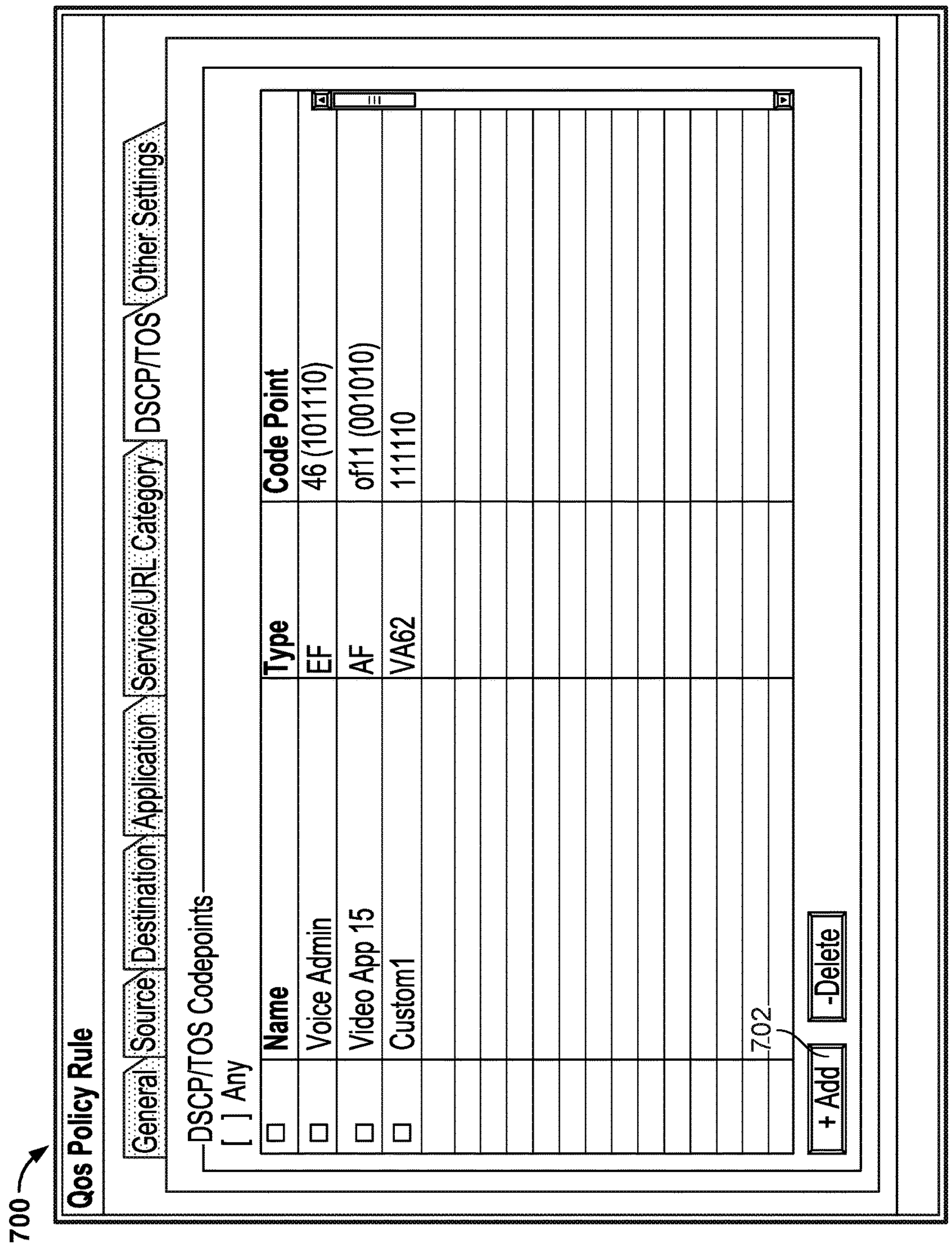
FIG. 7 illustrates an embodiment of an interface.

FIG. 7 illustrates an embodiment of an interface. In various embodiments, interface 700 is shown to an administrator of appliance 102 in response to the administrator accessing a configuration portal. Interface 700 can be used to associate code points with a policy and a QoS class. Although the description thus far has primarily referenced DSCP, other types of code points can also be used in conjunction with the techniques described herein, such as legacy Type of Service (ToS) code points. Similarly, code points can be manipulated with respect to both IPv4 and IPv6 as applicable.

Figure 8:
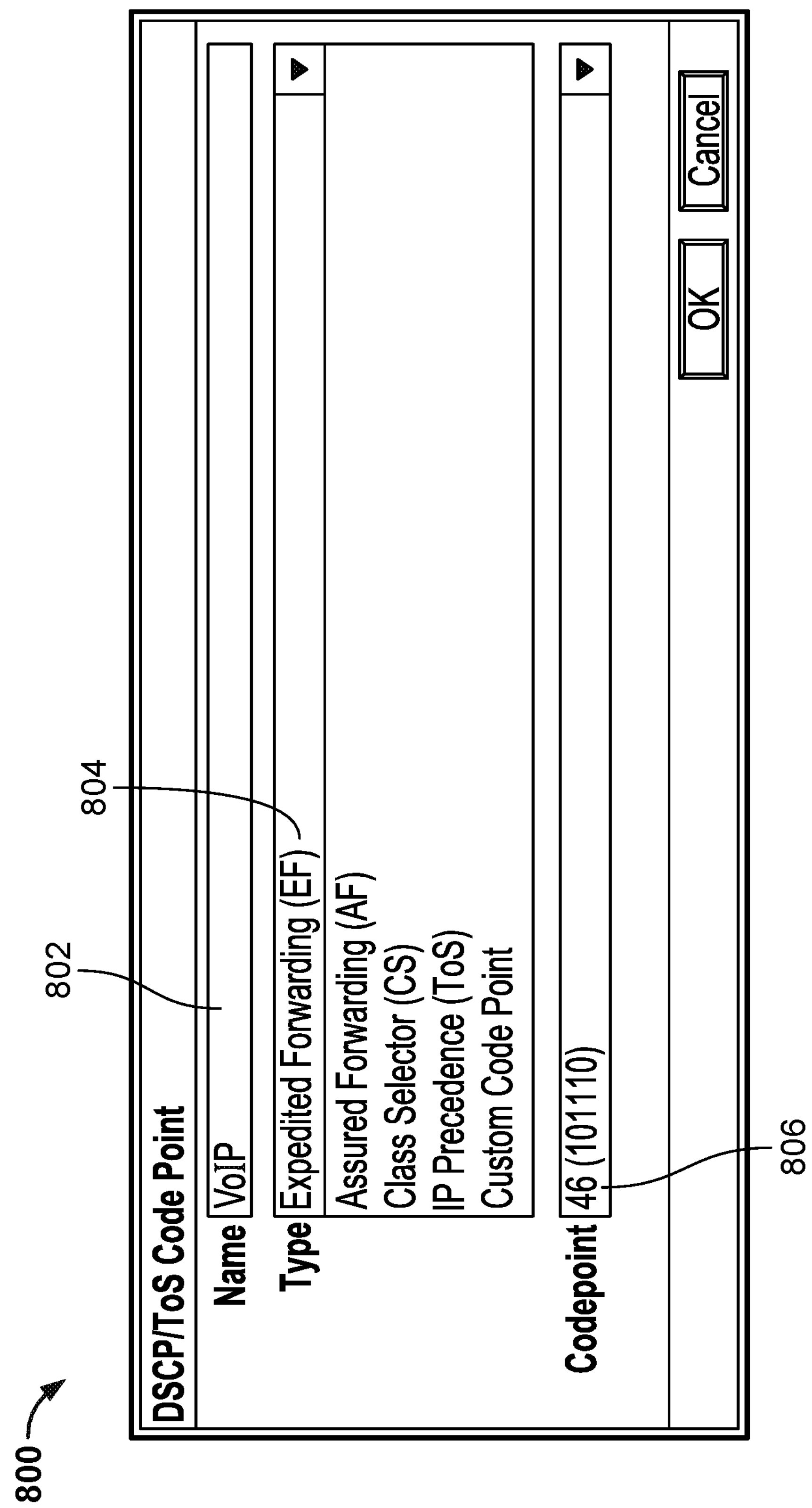
FIG. 8 illustrates an embodiment of an interface.

Choosing "Add" button 702 displays interface 800 of FIG. 8, which allows the administrator to add predefined code points or a custom code point. As shown in interface 800, the user can assign a name to the code point (802), can pick from one of several types (804), and specify the code point value in a profile (806). In some embodiments, the code point values the administrator can choose from will change with the type selected, such that for a given type, the only code points available in region 806 are ones that are valid for the given type. The "custom" code point allows the administrator to enter a specific code point name and binary value and in some embodiments must be six bits (and can be any value between 0 and 63).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

receive, in conjunction with an initialization of an application executing on a first device, a first specification of a nature of use of the application;

determine, based at least in part on the received first specification, and for a first packet associated with a first network traffic flow and originating from the application executing on the first device, a first differentiated services header value (DSHV) to associate with the first packet;

use the first DSHV to perform a lookup of a Quality of Service treatment associated with the first DSHV;

apply the treatment to the first packet;

receive, in conjunction with a subsequent initialization of the application executing on the first device, a second specification of a nature of use of the application that is different from the first specification; and determine, based at least in part on the received second specification, and for a second packet associated with a second network traffic flow and originating from the application executing on the first device, a second DSHV to associate with the second packet, wherein the second DSHV is different from the first DSHV; and a memory coupled to the processor and configured to provide the processor with instructions.

2. The system of claim 1 wherein determining the first DSHV includes evaluating a context associated with a way in which the application is used and selecting the first DSHV based at least in part on the context.

3. The system of claim 2 wherein evaluating the context in which the application is used includes evaluating the application that originated the first packet.

4. The system of claim 2 wherein evaluating the context in which the application is used includes evaluating a user identifier associated with an originator of the first packet.

5. The system of claim 2 wherein evaluating the context in which the application is used includes evaluating a geolocation.

6. The system of claim 2 wherein evaluating the context in which the application is used includes evaluating at least one of a source and a destination associated with the first network traffic flow.

7. The system of claim 1 wherein the first DSHV comprises a Differentiated Service Code Point value.

8. The system of claim 1 wherein the first DSHV comprises a Type of Service value.

9. The system of claim 1 wherein the processor is further configured to associate the first DSHV with the first network traffic flow in a session table.

10. The system of claim 1 wherein the processor is further configured, upon a detection of a context change associated with the first network traffic flow, to change the first DSHV to the second DSHV in a subsequent packet associated with the first network traffic flow.

11. The system of claim 1 wherein the processor is further configured to generate a session record that includes a Differentiated Service Code Point value to be used for a session associated with the first device.

12. The system of claim 1 wherein the processor is further configured to generate a session record that includes a Differentiated Service Code Point value to be used for return traffic associated with the first device.

13. The system of claim 1 wherein the processor is further configured to generate a session record that includes the Quality of Service treatment to be used for a session associated with the first device.

14. The system of claim 1 wherein the processor is further configured to receive a customizable Differentiated Service Code Point profile.

15. The system of claim 1 wherein the first packet is a packet other than an initial packet sent by the first device in conjunction with the first network traffic flow.

16. A method, comprising:

receiving, in conjunction with an initialization of an application executing on a first device, a first specification of a nature of use of the application;

determining, based at least in part on the received first specification, and for a first packet associated with a first network traffic flow and originating from the application executing on the first device, a first differentiated services header value (DSHV) to associate with the first packet;

using the first DSHV to perform a lookup of a Quality of Service treatment associated with the first DSHV;

applying the treatment to the first packet;

receiving, in conjunction with a subsequent initialization of the application executing on the first device, a second specification of a nature of use of the application that is different from the first specification; and determining, based at least in part on the received second specification, and for a second packet associated with a second network traffic flow and originating from the application executing on the first device, a second DSHV to associate with the second packet, wherein the second DSHV is different from the first DSHV.

17. The method of claim 16 wherein determining the first DSHV includes evaluating a context associated with a way in which the application is used and selecting the first DSHV based at least in part on the context.

18. The method of claim 17 wherein evaluating the context in which the application is used includes evaluating the application that originated the first packet.

19. The method of claim 17 wherein evaluating the context in which the application is used includes evaluating a user identifier associated with an originator of the first packet.

20. The method of claim 17 wherein evaluating the context in which the application is used includes evaluating a geolocation.

21. The method of claim 17 wherein evaluating the context in which the application is used includes evaluating at least one of a source and a destination associated with the first network traffic flow.

22. The method of claim 16 wherein the first DSHV comprises a Differentiated Service Code Point value.

23. The method of claim 16 wherein the first DSHV comprises a Type of Service value.

24. The method of claim 16 further comprising associating the first DSHV with the first network traffic flow in a session table.

25. The method of claim 16 further comprising, upon a detection of a context change associated with the first network traffic flow, changing the first DSHV to the second DSHV in a subsequent packet associated with the first network traffic flow.

26. The method of claim 16 further comprising generating a session record that includes a Differentiated Service Code Point value to be used for a session associated with the first device.

27. The method of claim 16 further comprising generating a session record that includes a Differentiated Service Code Point value to be used for return traffic associated with the first device.

28. The method of claim 16 further comprising generating a session record that includes the Quality of Service treatment to be used for a session associated with the first device.

29. The method of claim 16 further comprising receiving a customizable Differentiated Service Code Point profile.

30. The method of claim 16 wherein the first packet is a packet other than an initial packet sent by the first device in conjunction with the first network traffic flow.

* * * * *